United States Patent [19]
Vogt

[11] 3,891,287
[45] June 24, 1975

[54] SLIDING BEARING
[75] Inventor: Ulrich Vogt, Reutlingen-Sondelfingen, Germany
[73] Assignee: Daimler-Benz Aktiengesellschaft, Germany
[22] Filed: Sept. 13, 1973
[21] Appl. No.: 396,715

[30] Foreign Application Priority Data
Sept. 14, 1972 Germany............................ 2245039

[52] U.S. Cl......................... 308/237 A; 308/DIG. 8
[51] Int. Cl. ............................................... F16c 9/02
[58] Field of Search........ 308/237 A, DIG. 008, 241

[56] References Cited
FOREIGN PATENTS OR APPLICATIONS
803,084  10/1958  United Kingdom............ 308/DIG. 8
1,143,680  2/1963  Germany........................... 308/237

Primary Examiner—M. Henson Wood, Jr.
Assistant Examiner—Gene A. Church
Attorney, Agent, or Firm—Craig & Antonelli

[57] ABSTRACT
A slide bearing with a bearing shell which has a running layer of bearing metal, especially lead or tin; the pin of a shaft, especially of a crankshaft, is journalled in the bearing shell whereby a thin layer of copper is applied onto the pin.

11 Claims, 1 Drawing Figure 3,891,287
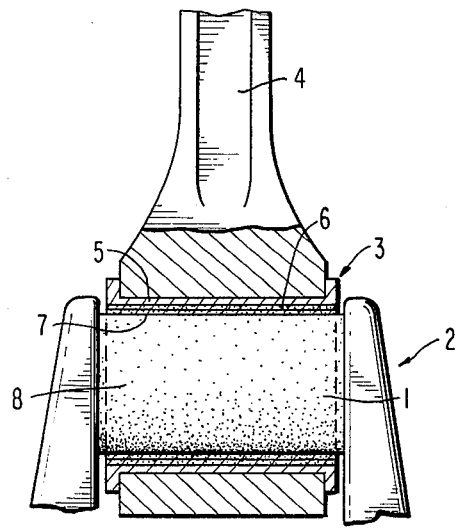

SLIDING BEARING

The present invention relates to a sliding bearing with a bearing box or brass which is provided with a running layer of bearing metal, especially lead or tin, in which is supported a pin of a shaft, especially of a crankshaft.

The pins of the shafts, in order to obtain as low as possible a surface roughness, are normally ground at first and then lapped. Especially the second machining operation, for the most part, a band-lapping, requires a high expenditure in work. Nonetheless, the surface roughness is still so large that a relatively high wear occurs at the pin.

The aim of the present invention resides in simplifying the machining of the pin and to reduce the wear at the pin.

The underlying problems are solved according to the present invention in that a thin layer of copper is applied onto the pin.

The copper equalizes unevenesses on the pin so that the pin merely has to be ground and the costly lapping operation can be economized. Unevenesses in the layer of copper which also occur during the application, for example, by means of electrolysis, are not harmful since the good deformability of the copper brings about during the running-in that the copper forms a very smooth layer. A good hydrodynamic lubrication can thus form in the gap between the pin and the bearing shell or box which is disturbed only to a very slight extent by raised portions. It has been discovered that with the slide bearing constructed according to the present invention the abrasion and wear is considerably smaller, especially at high rotational speeds, than with the bearing support of a ground and lapped pin in a bearing shell or box when the pin, however, is without a copper layer. A further advantage of the present invention resides in that the copper readily absorbs the heat produced in the gap between the pin and bearing shell and further transmits the same so that the viscosity of the bearing oil does not reach an excessively low value by reason of an excessively high temperature. Since the copper and the bearing metal of lead or tin are poorly soluble one within the other, there does not exist the danger that an adhesive wear occurs.

The present invention utilizes the recognition, surprising to the person skilled in the art, that under certain conditions, two relatively soft materials produce a good slide pairing. Thus, the present invention has nothing to do with proposals to use copper as bearing metal for the running layer and also nothing with an arrangement to let the pin be the carrier of the bearing metal and to displace the slide surface into the bearing body. In all of these cases, there exists a slide pairing between bearing metal and steel, whereas in the proposal according to the present invention there exists a slide pairing between bearing metal and copper.

Accordingly, it is an object of the present invention to provide a slide bearing which avoids by simple means the aforementioned shortcomings and drawbacks encountered in the prior art.

Another object of the present invention resides in a friction bearing which eliminates the need for costly lapping operations.

A further object of the present invention resides in a slide bearing which considerably reduces the wear at the pin.

Still another object of the present invention resides in a sleeve bearing which simplifies the machining of the pin and simultaneously reduces the wear at the pin.

A still further object of the present invention resides in a slide bearing which improves the lubrication as well as the length of life of the lubrication thereof.

Another object of the present invention resides in a slide bearing in which the wear is considerably smaller at high rotational speeds than in the slide bearings used heretofore.

A further object of the present invention resides in a friction bearing in which the temperature of the lubricating oil can be maintained within permissive ranges to prevent excessive temperatures and therewith excessively low viscosity of the bearing oil.

Still a further object of the present invention resides in a sliding bearing of the type described above in which there is no danger of an adhesive wear.

These and further objects, features and advantages of the present invention will become more apparent from the following description when taken in connection with the accompanying drawing which shows, for purposes of illustration only, one embodiment in accordance with the present invention, and wherein:

The single FIGURE is a partial cross-sectional view through a friction bearing in accordance with the present invention.

Referring now to the single FIGURE of the drawing, reference numeral 1 designates therein a pin of a crankshaft generally designated by reference numeral 2. A connecting rod 4, for example, of a reciprocating piston internal combustion engine, is supported on the pin 1 of the crankshaft 2 with the aid of a split bearing shell or box generally designated by reference numeral 3. The bearing shell or box 3 consists of a base body 5 with a conventional ternary layer 6 serving as running layer, which consists primarily of lead with additives of tin and copper, as known in the art, and which is internally coated with a thin cover layer 7, especially of lead or tin as corrosion protection. A layer 8 of about 3 $\mu$m thickness of copper is applied to the pin 1 within the area of the bearing shell 3 so that the slide pairing copper with bearing metal results.

In one advantageous construction of the present invention, the layer of copper has a thickness of about 3 $\mu$m. Such a slight thickness of the copper layer 8, whose manufacture requires relatively slight expenditures in time and costs, already suffices for achieving the advantages of the present invention. Of course, the present invention is not limited to this thickness which merely is indicative of the extremely slight thickness required to achieve the aims of the present invention.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A slide bearing which includes a bearing shell that is provided with a running layer of a soft bearing metal, in which is journalled a pin of a shaft, characterized in that a thin layer of copper is applied over the pin.

2. A slide bearing according to claim 1, characterized in that the layer of copper has a thickness of the order of 3 μm.

3. A slide bearing according to claim 1, characterized in that the shaft is a crankshaft.

4. A slide bearing which includes a bearing shell that is provided with a running layer of bearing material, in which is journalled a pin of a shaft, characterized in that a thin layer of copper is applied over the pin, the layer of copper has a thickness of 3μm, and in that the bearing metal principally consists of lead.

5. A slide bearing according to claim 4 characterized in that the shaft is a crankshaft.

6. A slide bearing which includes a bearing shell that is provided with a running layer of bearing material, in which is journalled a pin of a shaft, charactertized in that a thin layer of copper is applied over the pin, the layer of copper has a thickness of the order of 3μm, and in that the bearing metal principally consists of tin.

7. A slide bearing according to claim 6 characterized in that the shaft is a crankshaft.

8. A slide bearing which includes a bearing shell that is provided with a running layer of bearing material, in which is journalled a pin of a shaft, characterized in that a thin layer of copper is applied over the pin, and in that the bearing metal principally consists of lead.

9. A slide bearing according to claim 8, characterized in that the shaft is a crankshaft.

10. A slide bearing which includes a bearing shell that is provided with a running layer of bearing metal, in which is journalled a pin of a shaft, characterized in that a thin layer of copper is applied over the pin, and in that the bearing metal principally consists of tin.

11. A slide bearing according to claim 10, characterized in that the shaft is a crankshaft.

* * * * *